US006842561B2

(12) United States Patent
Mak et al.

(10) Patent No.: US 6,842,561 B2
(45) Date of Patent: Jan. 11, 2005

(54) OPTICAL PERFORMANCE MONITORING SCHEME

(75) Inventors: Gary Mak, Ottawa (CA); Shiguang Guo, Ottawa (CA); Eric S. Maniloff, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 164 days.

(21) Appl. No.: 10/113,827

(22) Filed: Mar. 29, 2002

(65) Prior Publication Data

US 2004/0208432 A1 Oct. 21, 2004

(51) Int. Cl.[7] .................................................. G02B 6/28
(52) U.S. Cl. ............................ 385/24; 385/48; 398/197
(58) Field of Search ............................. 385/24, 39, 48; 398/197

(56) References Cited

U.S. PATENT DOCUMENTS 5,991,477 A * 11/1999 Ishikawa et al. .............. 385/24
6,128,111 A * 10/2000 Roberts ....................... 398/29
2002/0015553 A1 * 2/2002 Claringburn et al. ......... 385/24
2003/0098682 A1 * 5/2003 Jin et al. ................. 324/76.21

OTHER PUBLICATIONS

Murakami et al., "A Remote Supervisory System Based on Subcarrier Overmodulation for Submarine Optical Amplifier Systems" *Journal of Lightwave Technology* 14:5:671–677, 1996.

* cited by examiner

*Primary Examiner*—Rodney Bovernick
*Assistant Examiner*—Sung Pak
(74) *Attorney, Agent, or Firm*—Jean-Pierre Fortin

(57) ABSTRACT

A method for determining optical power in a WDM optical signal that includes extracting a representative portion of the optical signal with wavelengths within some band δ wherein δ is a subset of Δ, the set of all channel wavelengths present in the optical signal and measuring the intensity of the extracted optical signal to determine the optical power per channel for any of the channels whose wavelengths are within the band δ.

15 Claims, 5 Drawing Sheets

OPTICAL PERFORMANCE MONITORING SCHEME

BACKGROUND

This invention relates to optical performance monitoring.

Optical performance monitoring schemes are often used in fiber optic systems to measure channel power. As a signal propagates along the fiber, it is degraded and attenuated. To maintain the signal, periodically the signal is amplified. By measuring the signal power, the appropriate amount of amplification is chosen that optimizes operation of the fiber optic system.

In a wavelength division multiplexing (WDM) scheme, optical performance monitoring is even more demanding. In WDM, multiple signals are transmitted simultaneously by transmitting each signal in a separate channel (i.e. separate carrier wavelength). Fiber nonlinearities such as stimulated Raman scattering (SRS) can make such measurements difficult.

One way of measuring channel power uses optical spectrum analyzers at each amplifier site in a fiber optic system. These relatively expensive devices directly measure the optical power for each channel. This technique becomes quite expensive on long haul optical fiber systems where a large number of amplifier sites are needed.

Another scheme applies a unique dither tone to each channel. The dither tone has amplitude that is a known fraction of the launch power in the channel. By measuring the tone power at some subsequent point in the fiber, the channel power at that point is inferred. This scheme avoids the relatively high costs of an optical spectrum analyzer but the dither tone scheme is susceptible to errors induced by fiber nonlinearities.

SUMMARY

In general, in one aspect the invention features a method for determining optical power in a WDM optical signal includes: extracting a representative portion of the optical signal with wavelengths within some band $\delta$ wherein $\delta$ is a subset of $\Delta$, the set of all channel wavelengths present in the optical signal; measuring the intensity of the extracted optical signal; and determining the optical power per channel for any of the channels whose wavelengths are within the band $\delta$.

Embodiments of the method may include any one of the following features.

The method may further include tapping a representative portion of the optical signal. The method may further include determining a set of bands $\delta_i$ such that every wavelength in $\Delta$ is included in at least one band element $\delta_i$ and for each band $\delta_i$, extracting, measuring and determining the optical power per channel for any of the channels whose wavelength is within the band $\delta_i$. The measuring of the intensity of the extracted optical signal may use a photodetector.

The determining of a set of bands $\delta_i$ may include: choosing the bands based on a desired accuracy for the channel power measurement or based on a desired time required to determine the optical power for each channels.

The extracting of a representative portion of the optical signal for band $\delta_i$ may include filtering the tapped representative sample to pass light with wavelengths approximately in the band $\delta_i$. The filtering may use a tunable filter. The method may further include controlling the tunable filter in order to pass light in the band $\delta_i$.

The extracting of a representative portion of the optical signal for band $\delta_i$ may include selectively coupling light in the representative sample with wavelengths within the band $\delta_i$ to unique photodetectors.

The method may further include determining the optical power crosstalk in the band $\delta$ from channels whose wavelengths are not in the band $\delta$.

In another aspect, the invention features an apparatus for determining optical power in an optical signal. The apparatus includes: a component that extracts a representative portion of the optical signal with wavelengths within some band $\delta$ wherein $\delta$ is a subset of $\Delta$, the set of wavelengths present in the optical signal; a component that measures the intensity of the extracted optical signal; and a processor that determines the optical power per channel for any of the channels whose wavelengths are within the band $\delta$ by using the measured intensity.

The apparatus may further include: a component that extracts for each band $\delta_i$ in a set of bands, a representative portion of the optical signal with wavelengths within band $\delta_i$ wherein every wavelength in $\Delta$ is included in at least one band element $\delta_i$ of the set of bands; a component that measures the intensity of each extracted optical signal; and a processor that determines the optical power per channel for any of the channels whose wavelengths are within the band $\delta_i$ by using any of the measured intensities. The component that measures the intensity of the extracted optical signal may include a photodetector. The component that extracts a representative portion of the optical signal for band $\delta_i$ may include a filter that passes light with wavelengths approximately in the band $\delta_i$. The filter may be tunable to pass each band $\delta_i$. The set of bands $\delta_i$ may be determined by a method based on a desired accuracy for the channel power measurement or based on a desired time required to determine the optical power for each channels.

The apparatus may include a wavelength dependent coupler that extracts a representative portion of the optical signal for band $\delta_i$ and feeds the representative sample with wavelengths within the band $\delta_i$ to a unique photodetector.

The processor may determine the optical power crosstalk in the band $\delta$ from channels whose wavelengths are not in the band $\delta$.

Any one of the claims alone or in combination may provide any one, if any, of the following advantages. The method may allow for the accurate measurement of channel power, even in the presence of SRS crosstalk, without the use of an optical spectrum analyzer.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
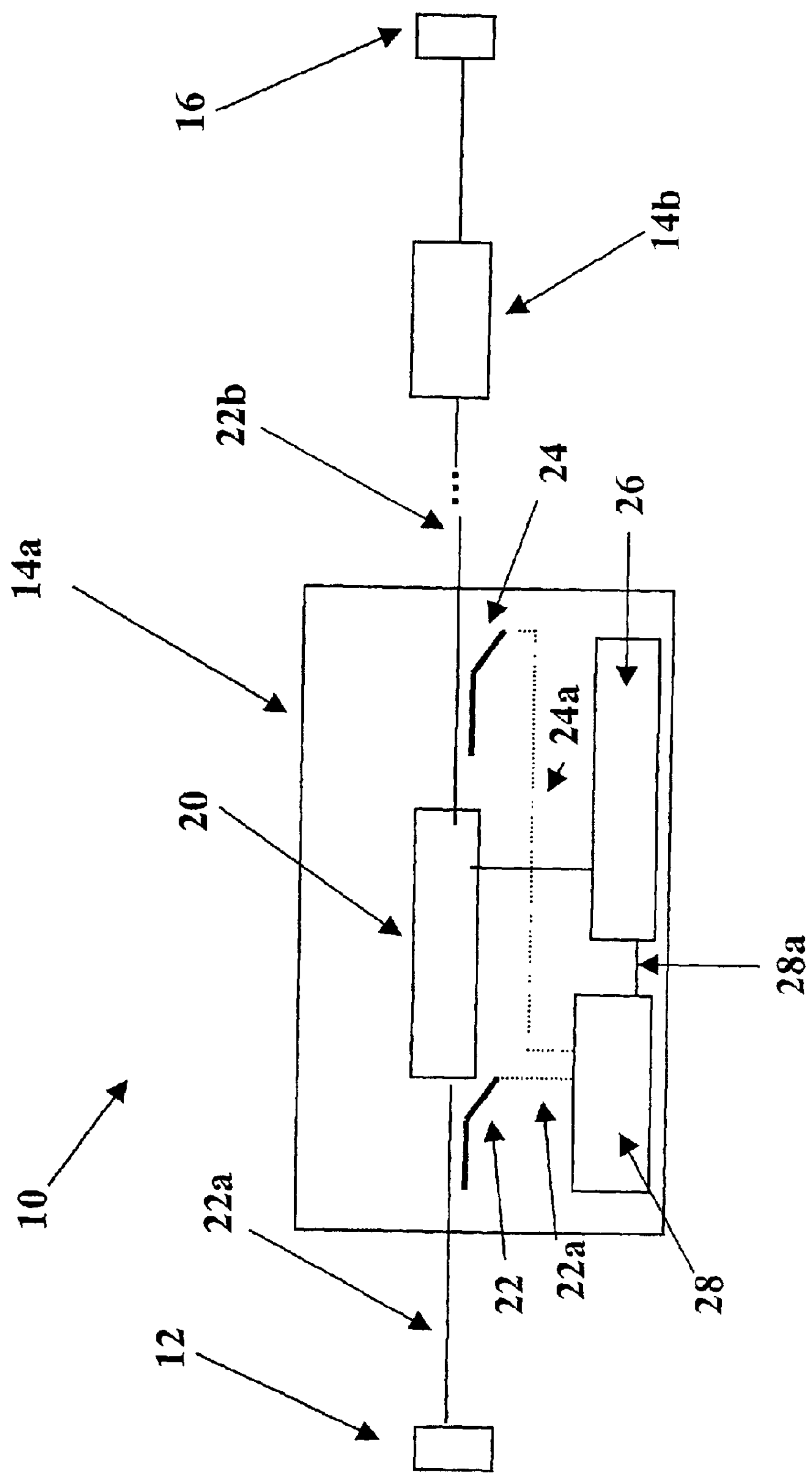
FIG. 1 is a block diagram of a fiber optic system for WDM.
Figure 2A:
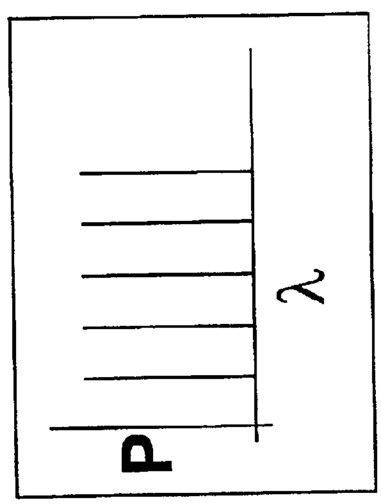
FIG. 2A is a plot of an incident power spectrum in a WDM system.

Referring to FIG. 1, a wavelength division multiplexing optical fiber system 10 is shown. The fiber optic system 10 includes a launch system 12 that launches the optical signals along an optical fiber 22*a*. A typical launch optical power spectrum is shown in FIG. 2A. The launch system 12 is typically a laser transmitter. The launch system 12 launches n signals, one on each channel $c_1$ to $c_n$ at wavelengths $\lambda_1$ to $\lambda_n$. The set of wavelengths $\lambda_1$ to $\lambda_n$ define a set $\Delta$ of all the channel wavelengths present in the WDM system. The launch system 12 introduces a unique dither tone to each of the channels. Typically these tones range in frequency from 50 to 500 kHz. The amplitudes of the dither tones are directly proportional to launch power for that channel and are typically about 1% to about 5% of the channel power.

As the signal propagates along the fiber 22*a*, the signal is attenuated and distorted. The signal reaches a monitoring/amplifying site 14*a*. The purpose of the site 14*a* is to amplify and correct for the distortion and attenuation of the signal and then launch the signal onto the next fiber segment 22*b*. From there, the signal propagates along fiber segments to the next amplifier site, for example 14*b*, ultimately reaching the destination receiver station 16.

In order to maintain optimum signal fidelity, the site 14*a* measures the channel power and adjusts the amplifier gain accordingly. In order to accomplish this, the monitoring/amplifying site 14*a* includes optical taps 22 and 24 that couples a small fraction of the optical signal before and after amplification respectively, a power measurement apparatus 28 that determines the power in each channel, a control apparatus 26 that uses the power measurements from power measurement apparatus 28 and determines the appropriate gain settings for the variable amplifiers 20. The system further includes fiber segments 22*a* and 24*a* for guiding the tapped light to the power measurement apparatus 28 and lines 28*a* and 29*a* for communicating control signals between the power measurement system and the control system and the control system and the amplifiers 20.

The taps 22 and 24 typically couple a fixed, small portion of the signal, for example about 2% of the main signal. The measurement system measures the total power in this tapped signal as a function of time. Power measurement apparatus 28 samples the data fast enough so that the Nyquist frequency of the sampling rate exceeds the bandwidth of the dither tones and also samples long enough in order to provide resolution sufficient to resolve the dither tones. Power measurement apparatus 28 applies a Fourier transform to the sampled time domain data. The amplitude of the transform at each dither tone frequency is directly proportional to the power in that channel.

Figure 2B:
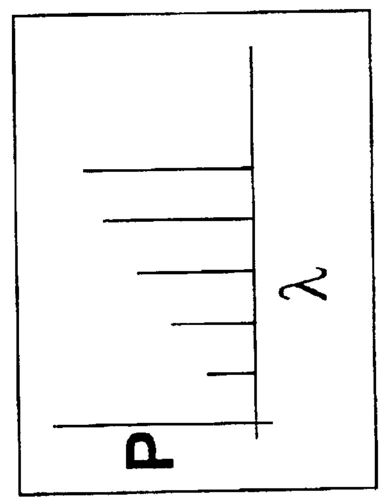
FIG. 2B is a plot showing disruption of a flat power spectrum characteristic due to stimulated Raman scattering (SRS) in a WDM system.

The power measurement scheme described above can often run into difficulties. It relies on the one-to-one correspondence between dither frequency and the WDM channel (optical wavelength). Fiber nonlinearities in the fiber 22*a*, 22*b* disrupt the unique correspondence between the dither tone and the channel. An example of such a nonlinearity is stimulated Raman scattering. FIG. 2B shows the optical power spectrum of the signal from FIG. 2A after it has been degraded by SRS. As the signal propagates through the fiber, SRS transfers signal power from shorter wavelengths to longer wavelengths. This transfers tone power from one channel to another (so called "crosstalk"), which makes accurate channel power measurements more difficult.

In order to better understand this effect it is instructive to understand some of the details of SRS. SRS is a crosstalk mechanism between two channels in the WDM. The strength of the crosstalk reaches a maximum when the difference in wavelength between two channels is approximately 100 nm (this difference is computed near 1500 nm) and the strength of the crosstalk drops off exponentially as the difference in channel wavelength deviates from this maximum. Given the set of wavelengths $\Delta$, a set of bands of wavelengths $\delta_i$ are defined such that every wavelength in $\Delta$ exists in some band. Here, a band is simply some range of wavelengths. In typical WDM systems, channels are spaced by about 0.8 nm and since this difference is small compared to 100 nm the crosstalk due to SRS is small between neighboring channels. In other words, channels whose wavelengths fall into a band with a range small compared to 100 nm have small SRS related crosstalk. Crosstalk with more distant channels can be quite appreciable. For example, in a WDM systems with about 125 channels it is possible for the shortest wavelength channel and the longest wavelength channel to have the maximum SRS crosstalk.

The channel power measurement apparatus 28 is designed to address this issue and to avoid the erroneous channel power measurements that can result from SRS related crosstalk.

Figure 3:
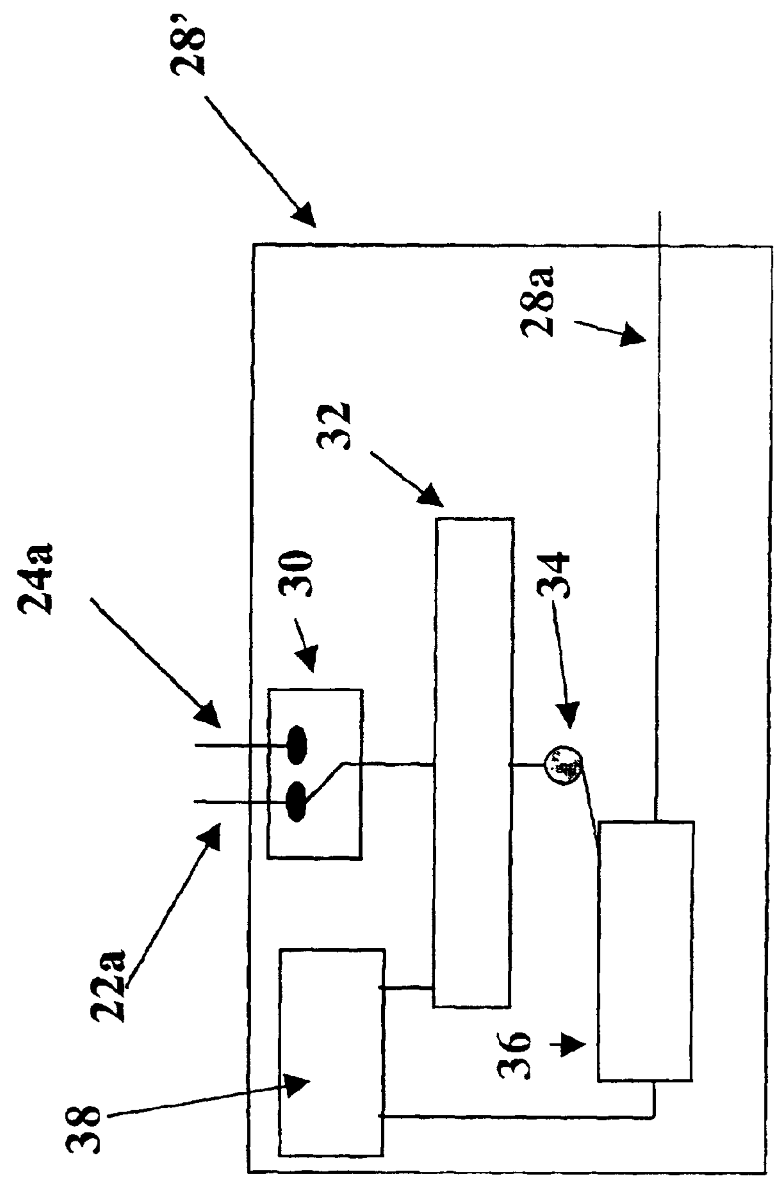
FIG. 3 a block diagram of a system for accurately measuring channel power in a WDM system in the presence of SRS.

FIG. 3 shows an example 28' of the channel power apparatus 28. The apparatus takes the inputs 22*a* and 24*a* described above that guide the tapped light from before or after the amplifiers respectively. A switch 30 allows the apparatus 28' to measure channel power from either input 22*a* or 24*a*. After passing through the switch 30, the desired tapped light signal passes through tunable filter 32. The center pass frequency of the pass band are set by filter control 38. (The filter control could also control the filter passband width.) The filter only passes the portion of the signal in the pass band. The filtered signal impinges on photodetector 34, which converts the intensity of the light signal into an electrical signal. The resulting electrical signal is passed to the processing apparatus 36. The processing apparatus 36 samples the electrical signal from the photodetector and computes the amplitude of the dither tones that correspond to channels in the passband. Because the SRS related crosstalk is exponentially small for channels within the pass band, the computed dither tone amplitude from the filtered signal are relatively accurate measures of channel power. The computed channel powers are output from the measurement apparatus along wire 28*a* to the control apparatus 26. The processing apparatus 36 furthermore sends control signals to the filter control to change the center frequency of the pass band so as to sample another band of the optical signal. Using the measurement apparatus 28', the channel powers are computed sequentially. Specifically, the power for each channel in the signal is measured by sequentially changing the center frequency of the filter to cover all the bands such that all of the channels have been sampled.

Figure 4:
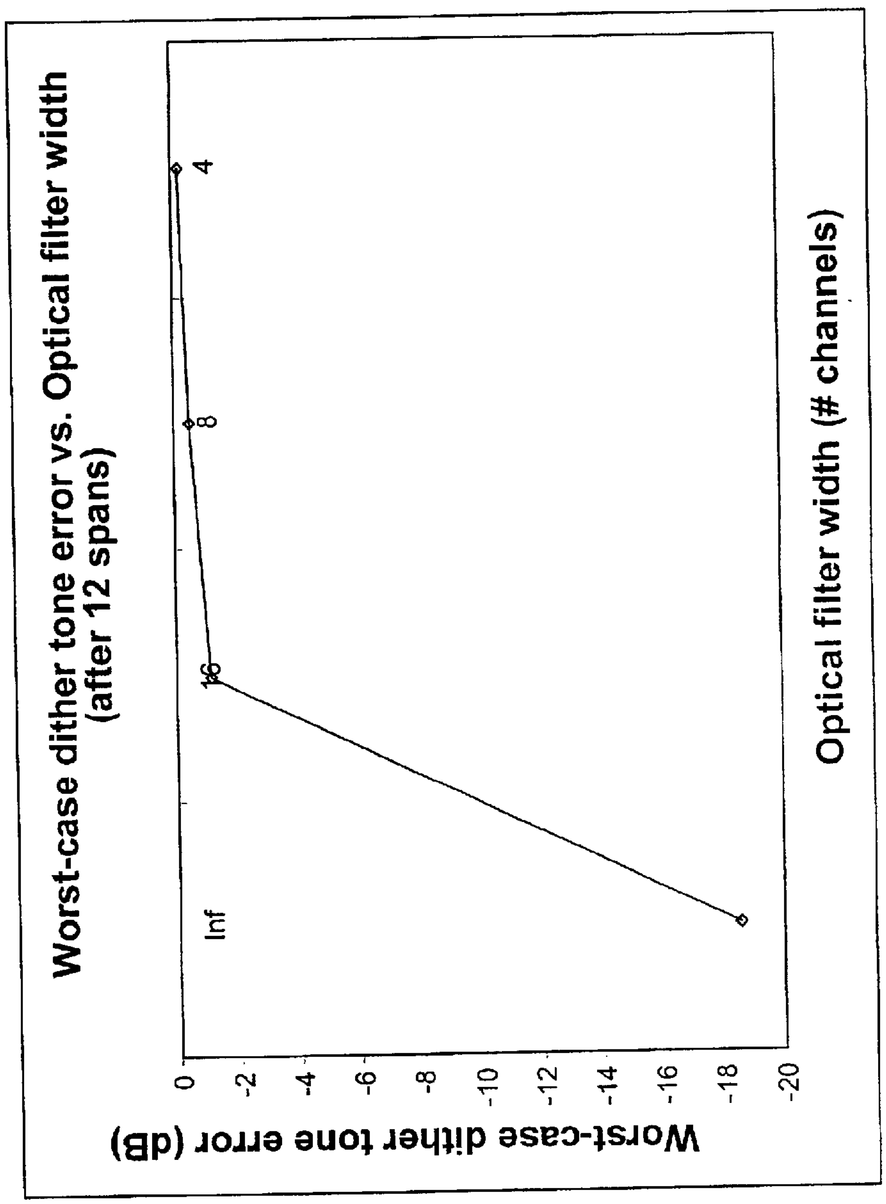
FIG. 4 is a plot that shows a relation between optical filter width and dither tone error.

There exists a choice between the width of the passband and the number of samples that are needed to measure all channels. The larger the passband the larger the number of channels that are simultaneously measured resulting in fewer number of samples in order to span all the channels. The trade off is that as the width of the passband increases then so does the error due to SRS. Thus, the channel power measurement apparatus 28' is customized so as to optimize the tradeoff between number of samples vs. measurement error given a desired dither tone accuracy. FIG. 4 shows the relationship between the dither tone measurement error and the optical filter width.

Figure 5:
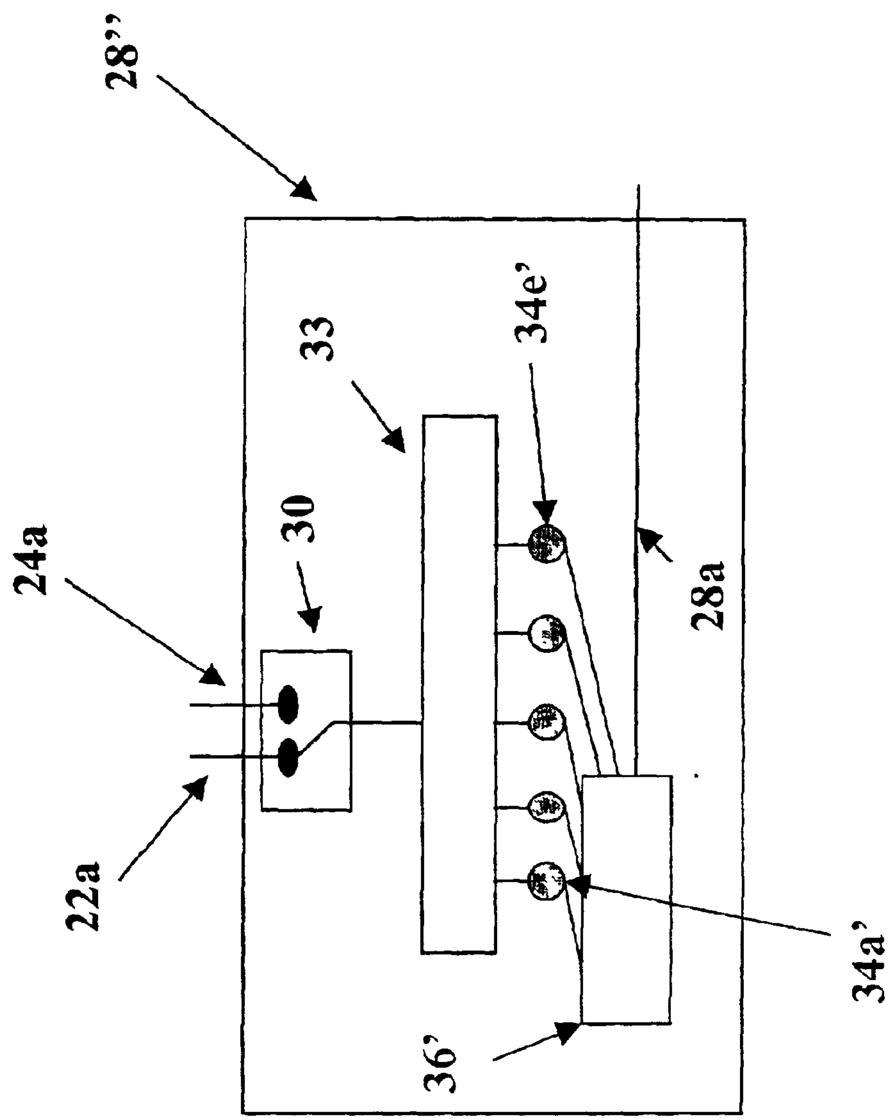
FIG. 5 is a block diagram that shows another system for accurately measuring channel power in a WDM system in the presence of SRS.

FIG. 5 shows another example 28" of the channel power apparatus 28. The apparatus takes the inputs 22*a* and 24*a* described above that guide the tapped light from before or after the amplifiers respectively. A switch 30 allows the apparatus 28' to measure channel power from either input 22*a* or 24*a*. After passing through the switch 30, the desired tapped light signal passes into a wavelength dependent coupler 33. The wavelength dependent coupler splits the optical signal into n portions based on wavelength. Given that the incoming signal is made up of m channels, the coupler splits the signal into portions that span about m/n channels (Channels at the highest or lowest wavelengths may be exceptions to this). The split signals are guided to n number of photodetectors, for example 34*a'*–34*e'*. The photodetectors 34*a'*–34*e'* convert the optical signal to an electrical signal and the electrical signal is passed to the channel power measurement apparatus 36'. For each of the n signals, the apparatus 36' samples the signal from the photodetectors and computes the dither tone amplitude for the dither tones corresponding to the channels that are coupled to the photodetector that produced the signal. As described above, as the range of wavelengths of the channels that are coupled to each photodetector is small, the computation of the channel power by computing the amplitude of its assigned dither tone is reasonably accurate. By processing all n signals, the apparatus 28" computes the tone amplitude and thus the channel power for all the channels in the signal. These computed channel powers are output via wire 28*a* to the control apparatus 26. Similar to the tradeoffs described for apparatus 28', the apparatus 28" has n, the number of wavelength dependent couplers, as a design parameter. The larger the number of couplers the smaller the band for each coupler. This leads to higher tone accuracy since the errors due to SRS are further suppressed but as the number of couplers increases so does the cost of the apparatus as well as the processing capability of the measuring apparatus 36'.

In other embodiments, that use either the tunable filtering of apparatus 28' or band dependent coupling of apparatus 28", the measuring apparatus can further compute the crosstalk contributions from other wavelengths outside a band. Specifically, once the dither tone profile across all channels is known, first-order estimates of the crosstalk can be obtained. This crosstalk information can be passed onto the control apparatus 26 wherein algorithms can take advantage of this information to correct for tone power errors, achieving even higher accuracy.

What is claimed is:

1. A method for determining optical power in a WDM optical signal comprising:

tapping a representative portion of the optical signal;

extracting a representative portion of the tapped optical signal with wavelengths within some band $\delta$ wherein $\delta$ is a subset of $\Delta$, the set of all channel wavelengths present in the optical signal and where $\delta$ is less than $\Delta$, the set of all channel wavelengths;

measuring the intensity of the extracted optical signal; and determining the optical power per channel for any of the channels whose wavelengths are within the band $\delta$ by;

determining a set of bands $\delta_i$ such that every wavelength in $\Delta$ is included in at least one band element $\delta_i$ and for each band $\delta_i$, extracting, measuring and determining the optical power per channel for any of the channels whose wavelength is within the band $\delta_i$.

2. The method of claim 1 wherein measuring the intensity of the extracted optical signal uses a photodetector.

3. The method of claim 2 wherein extracting a representative portion of the optical signal for band $\delta_i$ comprises filtering the tapped representative sample to pass light with wavelengths approximately in the band $\delta_i$.

4. The method of claim 3 wherein determining a set of bands $\delta_i$ comprises:

choosing the bands based on a desired accuracy for the channel power measurement or based on a desired time required to determine the optical power for each channels.

5. The method of claim 4 wherein filtering uses a tunable filter.

6. The method of claim 5 further comprising controlling the tunable filter in order to pass light in the band $\delta_i$.

7. The method of claim 2 wherein extracting a representative portion of the optical signal for band $\delta_i$ comprises selectively coupling light in the representative sample with wavelengths within the band $\delta_i$ to unique photodetectors.

8. The method of claim 1 further comprising determining the optical power crosstalk in the band $\delta$ from channels whose wavelengths are not in the band $\delta$.

9. An apparatus for determining optical power in an optical signal comprising a component that extracts a representative portion of the optical signal with wavelengths within some band $\delta$ wherein $\delta$ is a subset of $\Delta$, the set of wavelengths present in the optical signal and where $\delta$ is less than $\Delta$, the set of all channel wavelengths;

a component that extracts for each band $\delta_i$ in a set of bands, a representative portion of the optical signal with wavelengths within band $\delta_i$ wherein every wavelength in $\Delta$ is included in at least one band element $\delta_i$ of the set of bands;

a component that measures the intensity of each extracted optical signal; and a processor that determines the optical power per channel for any of the channels whose wavelengths are within the band $\delta$ by using the measured intensity; and that determines the optical power per channel for any of the channels whose wavelengths are within the band $\delta_i$ by using any of the measured intensities.

10. The apparatus of claim 9 wherein the component that measures the intensity of the extracted optical signal comprises a photodetector.

11. The apparatus of claim 10 wherein the component that extracts a representative portion of the optical signal for band $\delta_i$ comprises a filter that passes light with wavelengths approximately in the band $\delta_i$.

12. The apparatus of claim 11 wherein the filter is tunable to pass each band $\delta_i$.

13. The apparatus of claim 12 wherein the set of bands $\delta_i$ is determined by a method based on a desired accuracy for the channel power measurement or based on a desired time required to determine the optical power for each channels.

14. The apparatus of claim 10 wherein the wavelength dependent coupler extracts a representative portion of the optical signal for band $\delta_i$ and feeds the representative sample with wavelengths within the band $\delta_i$ to a unique photodetector.

15. The apparatus of claim 9 wherein the processor determines the optical power crosstalk in the band $\delta$ from channels whose wavelengths are not in the band $\delta$.

* * * * *